(12) United States Patent
Jang et al.

(10) Patent No.: US 7,065,774 B2
(45) Date of Patent: Jun. 20, 2006

(54) OPTICAL PICKUP ACTUATOR AND OPTICAL DISC DRIVE USING THE SAME

(75) Inventors: Dae-jong Jang, Gyeonggi-do (KR); Kyung-sik Shin, Gyeonggi-do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 150 days.

(21) Appl. No.: 10/435,381

(22) Filed: May 12, 2003

(65) Prior Publication Data

US 2004/0066730 A1    Apr. 8, 2004

(30) Foreign Application Priority Data

Oct. 2, 2002  (KR)  .................. 10-2002-0060099

(51) Int. Cl.
*G11B 7/085*  (2006.01)
*G11B 7/00*  (2006.01)
(52) U.S. Cl. .................... 720/685; 720/683; 369/44.15
(58) Field of Classification Search .............. 369/44.14, 369/44.15, 44.16, 44.22; 720/681, 682, 683, 720/685; 359/814, 824
See application file for complete search history.

(56) References Cited

U.S. PATENT DOCUMENTS

| 5,296,831 | A | * | 3/1994 | Suzuki | ....................... 336/200 |
| 5,541,898 | A | * | 7/1996 | Kasuga et al. | ........... 369/44.14 |
| 5,636,068 | A | * | 6/1997 | Tanaka | ....................... 359/814 |
| 5,870,373 | A | * | 2/1999 | Choi et al. | .................. 720/683 |
| 5,903,539 | A | * | 5/1999 | Tanaka | ....................... 369/221 |
| 6,519,100 | B1 | * | 2/2003 | Tanaka | ....................... 359/824 |
| 6,768,601 | B1 | * | 7/2004 | Ju | ............................... 359/824 |
| 2001/0019519 | A1 | * | 9/2001 | Suzuki et al. | ........... 369/44.16 |
| 2001/0028628 | A1 | * | 10/2001 | Suzuki et al. | ............... 369/244 |
| 2003/0012090 | A1 | * | 1/2003 | Kawano | .................. 369/44.16 |

FOREIGN PATENT DOCUMENTS

| JP | 07240032 | A | * | 9/1995 |
| JP | 08153334 | A | * | 6/1996 |
| JP | 08203104 | A | * | 8/1996 |
| JP | 09282687 | A | * | 10/1997 |
| JP | 10-134405 | | | 5/1998 |
| JP | 11232679 | A | * | 8/1999 |
| JP | 2000020979 | A | * | 1/2000 |
| JP | 2000276747 | A | * | 10/2000 |
| JP | 2001110072 | A | * | 4/2001 |

OTHER PUBLICATIONS

Chinese Office Action in corresponding Chinese Patent Application No. 03138254.1 and English translation thereof.

* cited by examiner

*Primary Examiner*—William J Klimowicz
(74) *Attorney, Agent, or Firm*—Staas & Halsey LLP

(57) ABSTRACT

Provided is an optical pickup actuator including a blade, a plurality of wires, coils, magnets, and connectors. The blade has an objective lens. The plurality of wires support the blade so that the blade moves around a predetermined holder. The coils are installed on the blade. The magnets interact with a current flowing through the coils to generate an electromagnetic force. The connectors electrically connect the wires and the coils so that a power supply supplies a current to the coils via the wires. The connectors include conductive plating terminals that are connected to the coils and installed on the body of the blade so that ends of the wires are connected to the connectors.

18 Claims, 3 Drawing Sheets

OPTICAL PICKUP ACTUATOR AND OPTICAL DISC DRIVE USING THE SAME

CROSS-REFERENCE TO RELATED APPLICATIONS

This application claims the priority of Korean Patent Application No. 2002-60099, filed on Oct. 2, 2002, in the Korean Intellectual Property Office, the disclosure of which is incorporated herein in its entirety by reference.

BACKGROUND OF THE INVENTION

1. Field of the Invention

The present invention relates to an optical pickup actuator and an optical disc drive using the same, and more particularly, to an optical pickup actuator using plate coils and an optical disc drive using the optical pickup actuator.

2. Description of the Related Art

Optical disc drives generally include an optical pickup used to record or reproduce information on or from a disc that is rotated by a spindle motor. Such an optical pickup records information on a disc by radiating light onto the disc via an objective lens or reproduces information from the disc by receiving light reflected from the disc. The optical pickup includes an actuator to control the position of the objective lens so that light is radiated onto the correct position of the disc.

FIG. 1 illustrates a conventional optical pickup actuator. Referring to FIG. 1, the optical pickup actuator includes a blade 2 on which an objective lens 1 is mounted, a plurality of wires 7, which support the blade 2 so that the blade 2 moves around a holder 3, a pair of magnets 5, which are installed on a base 4, and plate coils 6, which are installed on both sides of the blade 2. Here, the plurality of magnets 5 and the plate coils 6 operate as electromagnetic driving units to drive the blade 2 in focusing and tracking directions and to control the position of the objective lens 1.

A plurality of pattern coils (not shown) are formed on the plate coils 6. Thus, when a current flows through the pattern coils, the plate coils 6 interact with the pair of magnets 5, thereby generating an electromagnetic force by which the blade 2 is driven. In the related art, instead of the plate coils 6, winding coils are wound around the blade 2 at predetermined positions. However, in order to make an optical pickup compact and light, plate coils are preferred.

Reference numeral 8 denotes printed circuit boards (PCBs) which are installed on the blade 2 to electrically connect the pattern coils of the plate coils 6 and the wires 7. Thus, a current is supplied from a power supply (not shown) through the wires 7 and the PCBs 8 to the plate coils 6.

However, when the PCBs 8 are additionally installed on the blade 2 to electrically connect the wires 7 and the plate coils 6, the number of parts increases and the weight of the blade 2, the driving body of the actuator, increases to about 40–50 mg. Thus, the sensitivity of the actuator decreases. Also, since the PCBs 8 are adhered onto both sides of the blade 2 using a bond, the number of steps to assemble the optical pickup actuator and the dimensions of the blade 2 increase. This affects secondary resonant characteristics such as rolling, pitching, and yawing angles of the actuator with direction consequences on the actuator.

In order to compensate for these disadvantages, a structure in which a blade forms a single body including wires has been proposed. However, the attachment of a plurality of thin wires onto the blade is quite difficult in view of designing a mold. Also, as is known, the secondary resonant characteristics of an actuator having the blade and wires of the single body structure are not much better.

Accordingly, an optical pickup actuator having a structure capable of solving the problems of the conventional actuator is requested.

SUMMARY OF THE INVENTION

Accordingly, the present invention provides an optical pickup actuator having an improved structure to increase the sensitivity of the actuator and allow for high productivity by simplifying the connection structure between wires and coils to supply a current, and an optical disc drive using the same.

Additional aspects and advantages of the invention will be set forth in part in the description which follows and, in part, will be obvious from the description, or may be learned by practice of the invention.

The foregoing and/or other aspects of the present invention are achieved by providing an optical pickup actuator including a blade, a plurality of wires, coils, magnets, and connectors. The blade has an objective lens. The plurality of wires support the blade so that the blade moves around a predetermined holder. The coils are installed on the blade. The magnets interact with a current flowing through the coils to generate an electromagnetic force. The connectors electrically connect the wires and the coils so that a power supply supplies a current to the coils via the wires. Here, the connectors include conductive plating terminals that are connected to the coils and installed on the body of the blade so that ends of the wires are connected to the connectors.

The foregoing and/or other aspects of the present invention may also be achieved by providing an optical disc drive including an optical pickup having a spindle motor that spins a disc and an optical pickup actuator that controls a position of an objective lens to record or reproduce information on or from the disc by radiating light onto a desired position of the disc via the objective lens. The optical pickup actuator includes a blade, a plurality of wires, coils, magnets, and connectors. The blade has the objective lens. The plurality of wires support the blade so that the blade moves around a predetermined holder. The coils are installed on the blade. The magnets interact with a current flowing through the coils to generate an electromagnetic force. The connectors electrically connect the wires and the coils so that a power supply supplies a current to the coils via the wires, wherein the connectors include conductive plating terminals that are connected to the coils and installed on the body of the blade so that ends of the wires are connected to the connectors.

BRIEF DESCRIPTION OF THE DRAWINGS

The above and/or other features and advantages of the present invention will become more apparent by describing in detail exemplary embodiments thereof with reference to the attached drawings in which.

DETAILED DESCRIPTION OF THE INVENTION

Figure 1:
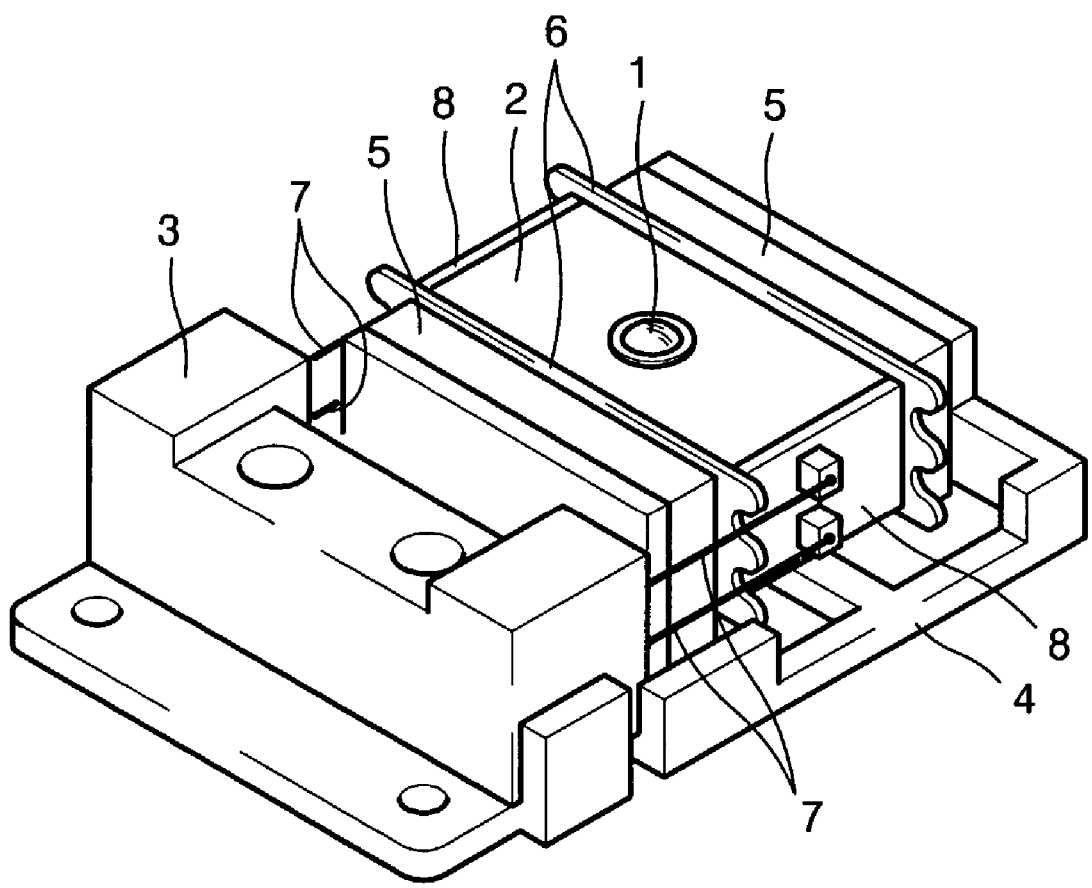
FIG. 1 is a perspective view of a conventional optical pickup actuator.
Figure 2:
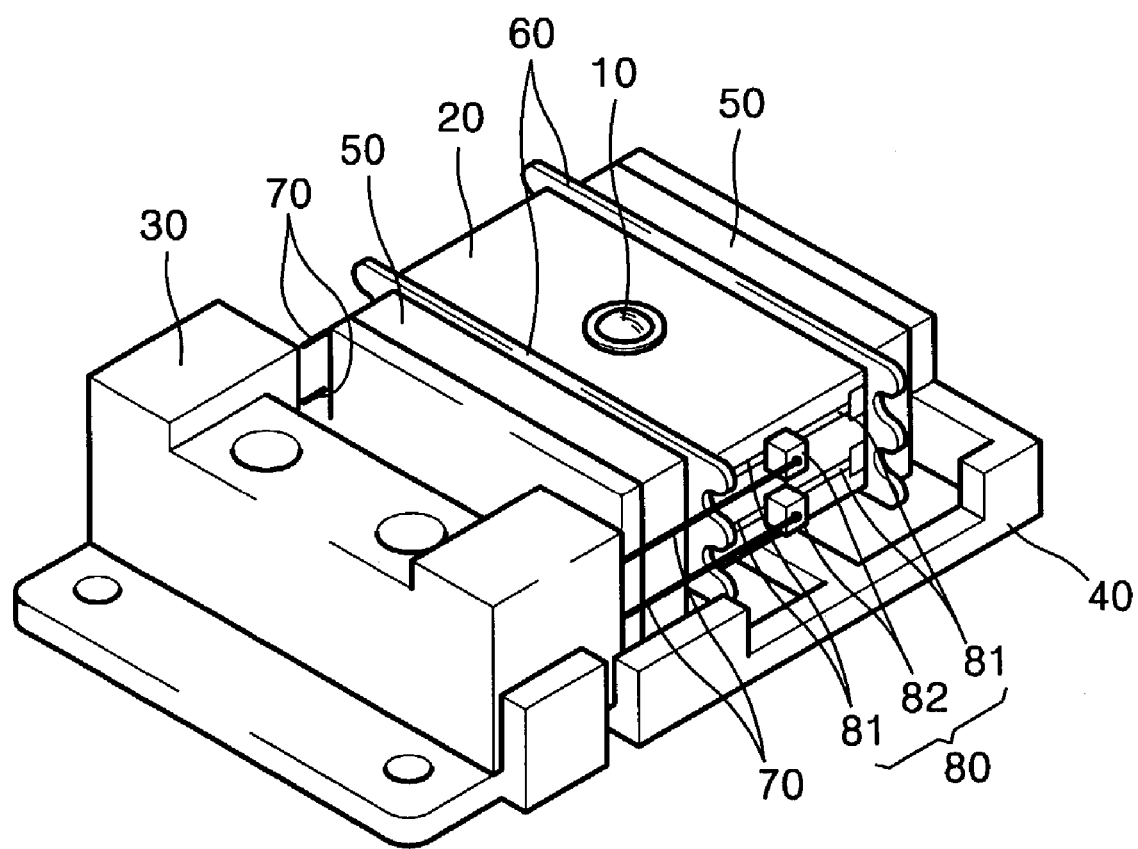
FIG. 2 is a perspective view of an optical pickup actuator according to an embodiment of the present invention.

FIG. 2 illustrates an optical pickup actuator, according to an embodiment of the present invention, which is used in an optical disc drive, adjusts the position of an objective lens, and radiates light onto a desired position of a disc, which spins by a spindle motor, for a recording or reproducing operation. Referring to FIG. 2, a holder 30 is placed on a base 40. A blade 20 on which an objective lens 10 is mounted is moveably supported by the holder 30 via a plurality of wires 70. A pair of magnets 50 are installed on the base 40. Plate coils 60 are installed on both sides of the blade 20 between the pair of magnets 50. Here, the plurality of magnets 50 and the plate coils 60 operate as electromagnetic driving units to drive the blade 20 in focusing and tracking directions and control the position of the objective lens 10. Thus, when a current is supplied from a power supply (not shown) through the wires 70 to the plate coils 60, the plate coils 60 interact with a magnetic field formed by the pair of magnets 50, thereby generating an electromagnetic force by which the blade 20 is driven.

Conductive plating terminals 80 are installed directly on both sides of the body of the blade 20, which is a mold, and electrically connect the plate coils 60 and the wires 70 to supply a current. It is preferable that the conductive plating terminals 80 are formed of a material having a good conductivity such as a silver-plated material. The conductive plating terminals 80 include connecting parts 81 connected to the plate coils 60 and soldering parts 82 onto which ends of the wires 70 are soldered. Thus, a current supplied through the wires 70 flows through the soldering parts 82 and the connectors 81 of the conductive plating terminals 80 to the plate coils 60.

Figure 3:
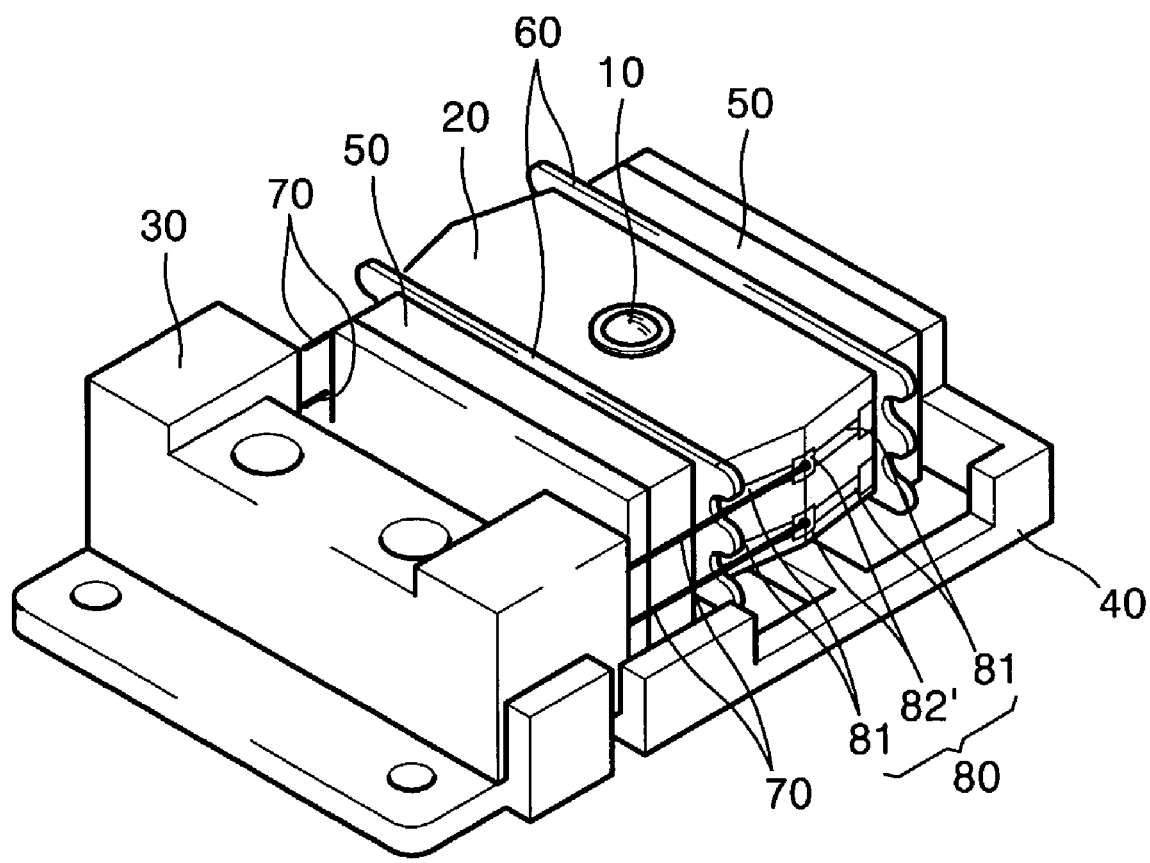
FIG. 3 is a perspective view of an optical pickup actuator according to another embodiment of the present invention.

Here, as shown in FIG. 2, it is preferable that the soldering parts 82 protrude more than the connecting parts 81, so that when the blade 20 moves from side to side, the corners of the plate coils 60 can be prevented from contacting the wires 70. Alternatively, as shown in FIG. 3, both sides of a blade 20' to which the wires 70 are connected may protrude instead of the soldering parts 82'.

In the above-described structure, when controlling of the actuator starts, the power supply supplies a current to the actuator via the wires 70, and then the current flows through the soldering parts 82 and the connecting parts 81 of the conductive plating terminals 80 to the pattern coils formed on the plate coils 60.

Accordingly, an actuator according to an embodiment of the present invention can electrically connect the wires 70 and the plate coils 60 only via the conductive plate terminals 80 without using additional PCBs, so that the position of an objective lens can be effectively controlled.

As described above, an optical pickup actuator according to the present invention and an optical disc drive using the same can achieve the following effects.

Since conductive plate terminals are installed on the body of a blade, additional PCBs do not need to be attached onto the blade. Thus, a process of assembling the optical pickup actuator can be simplified and the weight of a driving body, i.e., the blade, can become light, thereby improving the sensitivity of the optical pickup actuator.

Also, since PCBs are not adhered onto both sides of the blade, there is no front and rear or right and left asymmetry of the driving body, and as a result, the secondary resonant characteristics of the actuator improve.

Moreover, since the number of parts decreases, the cost of an actuator can be reduced.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An optical pickup actuator comprising:
   a blade having an objective lens;
   a plurality of wires to support the blade so that the blade moves around a predetermined holder;
   coils installed on the blade;
   magnets that interact with a current flowing through the coils to generate an electromagnetic force; and
   connectors electrically connecting the wires and the coils so that a power supply supplies a current to the coils via the wires,
   wherein the connectors include conductive plating terminals connected to the coils and installed on the body of the blade so that ends of the wires are connected to the connectors,
   wherein the conductive plating terminals comprise connecting parts connected to the coils and soldering parts to which ends of the wires are soldered, wherein the soldering parts protrude more than the connecting parts, and
   wherein the soldering parts displace the wires from the blade.

2. The optical pickup actuator of claim 1, wherein the coils are plate coils.

3. The optical pickup actuator of claim 1, wherein the conductive plating terminals are formed of a silver-plated material.

4. The optical pickup actuator of claim 1, wherein the blade is a mold.

5. An optical pickup actuator comprising:
   a blade having an objective lens;
   a plurality of wires to support the blade so that the blade moves around a predetermined holder;
   coils installed on the blade;
   magnets that interact with a current flowing through the coils to generate an electromagnetic force; and
   connectors electrically connecting the wires and the coils so that a power supply supplies a current to the coils via the wires,
   wherein the connectors include conductive plating terminals connected to the coils and installed on the body of the blade so that ends of the wires are connected to the connectors,
   wherein both sides of the blade, to which the wires are connected, protrude to form a vertex on both sides of the blade, and
   wherein each vertex displaces the wires from the blade.

6. An optical disc drive including an optical pickup having a spindle motor that spins a disc and an optical pickup actuator that controls a position of an objective lens to record and/or reproduce information on or from the disc by radiating light onto a desired position of the disc via the objective lens,
   wherein the optical pickup actuator comprises:
   a blade having the objective lens;
   a plurality of wires that support the blade so that the blade moves around a predetermined holder;
   coils that are installed on the blade;
   magnets that interact with a current flowing through the coils to generate an electromagnetic force; and
   connectors that electrically connect the wires and the coils so that a power supply supplies a current to the coils via the wires, wherein the connectors include conductive plating terminals that are connected to the coils and installed on the body of the blade so that ends of the wires are connected to the connectors, wherein the conductive plating terminals comprise connecting parts that are connected to the coils and soldering parts to which ends of the wires are soldered, wherein the soldering parts protrude more than the connecting parts, and wherein the soldering parts displace the wires from the blade.

7. The optical disc drive of claim 6, wherein the coils are plate coils.

8. The optical disc drive of claim 6, wherein the conductive plating terminals are formed of a silver-plated material.

9. The optical disc drive of claim 6, wherein the blade is a mold.

10. An optical disc drive including an optical pickup having a spindle motor that spins a disc and an optical pickup actuator that controls a position of an objective lens to record and/or reproduce information on or from the disc by radiating light onto a desired position of the disc via the objective lens, wherein the optical pickup actuator comprises:

a blade having the objective lens;

a plurality of wires that support the blade so that the blade moves around a predetermined holder;

coils that are installed on the blade;

magnets that interact with a current flowing through the coils to generate an electromagnetic force; and connectors that electrically connect the wires and the coils so that a power supply supplies a current to the coils via the wires, wherein the connectors include conductive plating terminals that are connected to the coils and installed on the body of the blade so that ends of the wires are connected to the connectors, wherein both sides of the blade, to which the wires are connected, protrude to form a vertex on both sides of the blade, and wherein each vertex displaces the wires from the blade.

11. An optical pickup actuator comprising:

a blade having an objective lens;

a plurality of wires to support the blade so that the blade moves around a predetermined holder;

coils installed on the blade;

magnets that interact with a current flowing through the coils to generate an electromagnetic force; and connectors electrically connecting the wires and the coils so that a power supply supplies a current to the coils via the wires, wherein the connectors include conductive plating terminals connected to the coils and installed on the body of the blade so that ends of the wires are connected to the connectors, wherein the conductive plating terminals comprise connecting parts connected to the coils and soldering parts to which ends of the wires are soldered, wherein the soldering parts protrude more than the connecting parts, and wherein the soldering parts place the wires in parallel to the connecting parts.

12. The optical pickup actuator of claim 11, wherein the coils are plate coils.

13. The optical pickup actuator of claim 11, wherein the conductive plating terminals are formed of a silver-plated material.

14. The optical pickup actuator of claim 11, wherein the blade is a mold.

15. An optical disc drive including an optical pickup having a spindle motor that spins a disc and an optical pickup actuator that controls a position of an objective lens to record and/or reproduce information on or from the disc by radiating light onto a desired position of the disc via the objective lens, wherein the optical pickup actuator comprises:

a blade having the objective lens;

a plurality of wires that support the blade so that the blade moves around a predetermined holder;

coils that are installed on the blade;

magnets that interact with a current flowing through the coils to generate an electromagnetic force; and connectors that electrically connect the wires and the coils so that a power supply supplies a current to the coils via the wires, wherein the connectors include conductive plating terminals that are connected to the coils and installed on the body of the blade so that ends of the wires are connected to the connectors, wherein the conductive plating terminals comprise connecting parts that are connected to the coils and soldering Parts to which ends of the wires are soldered, wherein the soldering parts protrude more than the connecting parts, and wherein the soldering parts place the wires in parallel to the connecting parts.

16. The optical pickup actuator of claim 15, wherein the coils are plate coils.

17. The optical pickup actuator of claim 15, wherein the conductive plating terminals are formed of a silver-plated material.

18. The optical pickup actuator of claim 15, wherein the blade is a mold.

* * * * *

UNITED STATES PATENT AND TRADEMARK OFFICE
CERTIFICATE OF CORRECTION

| | | |
|---|---|---|
| PATENT NO. | : 7,065,774 B2 | Page 1 of 1 |
| APPLICATION NO. | : 10/435381 | |
| DATED | : June 20, 2006 | |
| INVENTOR(S) | : Dae-jong Jang et al. | |

It is certified that error appears in the above-identified patent and that said Letters Patent is hereby corrected as shown below:

Column 6, Line 41, change "Parts" to --parts--.

Signed and Sealed this

Sixth Day of February, 2007

JON W. DUDAS
*Director of the United States Patent and Trademark Office*